United States Patent
Goyarola et al.

(10) Patent No.: US 9,200,748 B1
(45) Date of Patent: Dec. 1, 2015

(54) BAG-IN-BOX WINE CONTAINER

(71) Applicants: Pedro Goyarola, San Mateo, CA (US);
Juli Goyarola, San Mateo, CA (US)

(72) Inventors: Pedro Goyarola, San Mateo, CA (US);
Juli Goyarola, San Mateo, CA (US)

( * ) Notice: Subject to any disclaimer, the term of this patent is extended or adjusted under 35 U.S.C. 154(b) by 0 days.

(21) Appl. No.: 14/580,328

(22) Filed: Dec. 23, 2014

(51) Int. Cl.
*A47J 47/16* (2006.01)
*F16M 11/22* (2006.01)
*A47B 73/00* (2006.01)

(52) U.S. Cl.
CPC .............. *F16M 11/22* (2013.01); *A47B 73/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 611,857 | A * | 10/1898 | Buck | 248/105 |
| 1,687,138 | A * | 10/1928 | Myers | 211/72 |
| 2,472,001 | A * | 5/1949 | Buhoveckey | 206/209 |
| 2,925,235 | A | 2/1960 | Jaros | |
| 3,870,156 | A * | 3/1975 | O'Neill | 211/74 |
| 4,093,076 | A * | 6/1978 | Newton | 211/74 |
| D272,699 | S * | 2/1984 | Godfrey | D7/701 |
| 4,494,788 | A * | 1/1985 | Altemose | 294/161 |
| 4,546,883 | A * | 10/1985 | Youngdale | 206/521 |
| D285,168 | S * | 8/1986 | Van Arsdell | D8/373 |
| 4,699,342 | A | 10/1987 | Bartz | |
| 4,700,849 | A * | 10/1987 | Wagner | 211/41.2 |
| 4,784,360 | A * | 11/1988 | Mok | 248/313 |
| 4,944,415 | A * | 7/1990 | Orbach | 211/75 |
| 4,953,818 | A | 9/1990 | Contant | |
| D313,132 | S * | 12/1990 | Masacek | D7/701 |
| 5,002,246 | A | 3/1991 | Chaffin | |
| 5,107,877 | A * | 4/1992 | Chipman | 134/140 |
| D353,067 | S * | 12/1994 | Asmar | D6/552 |
| 5,715,953 | A * | 2/1998 | Brown | 211/74 |
| 5,740,928 | A | 4/1998 | Dale | |
| 6,991,117 | B2 * | 1/2006 | McCain | 211/75 |
| 7,118,078 | B2 * | 10/2006 | Vukas | 248/110 |
| 7,562,853 | B2 * | 7/2009 | Mazzola | 248/311.2 |
| 8,430,284 | B2 * | 4/2013 | Broadbent et al. | 224/148.4 |
| 8,567,617 | B1 * | 10/2013 | Tapager | 211/74 |
| 8,651,365 | B2 * | 2/2014 | Lymn et al. | 229/117.3 |
| 8,733,594 | B1 * | 5/2014 | White et al. | 222/105 |
| 8,905,269 | B2 * | 12/2014 | Everard et al. | 222/166 |
| 2007/0228127 | A1 * | 10/2007 | Gardner | 229/122.23 |
| 2008/0121766 | A1 | 5/2008 | Jorgensen | |
| 2010/0072223 | A1 | 3/2010 | Bedin | |
| 2012/0305595 | A1 * | 12/2012 | Braun et al. | 222/105 |

* cited by examiner

*Primary Examiner* — Monica Millner
(74) *Attorney, Agent, or Firm* — Kyle A. Fletcher, Esq.

(57) ABSTRACT

The bag-in-box wine container a decorative structure for storing and carrying boxed wine. The stand is comprised of two identical panels, a base structure and a carrying dowel. The base of the structure supports the box of wine while the two identical panels limit the traverse motion of the box. A dowel for convenient carrying is also provided.

12 Claims, 5 Drawing Sheets

BAG-IN-BOX WINE CONTAINER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of boxed wine accessories, more specifically, a device that is able to protect and support a bag-in-box wine.

SUMMARY OF THE INVENTION

An embodiment of the disclosure meets the needs presented above by generally comprising a decorative structure for storing and carrying boxed wine. The stand is comprised of two identical panels, a base structure and a carrying dowel. The base of the structure supports the box of wine while the two identical panels limit the traverse motion of the box. A dowel for convenient carrying is also provided.

These together with additional objects, features and advantages of the bag-in-box wine container will be readily apparent to those of ordinary skill in the art upon reading the nonetheless illustrative, embodiments of the bag-in-box wine container when taken in conjunction with the accompanying drawings.

In this respect, before explaining the current embodiments of the bag-in-box wine container in detail, it is to be understood that the bag-in-box wine container is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bag-in-box wine container.

It is therefore important that the claims be regarded as including such equivalent construction insofar as they do not depart from the spirit and scope of the bag-in-box wine container. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
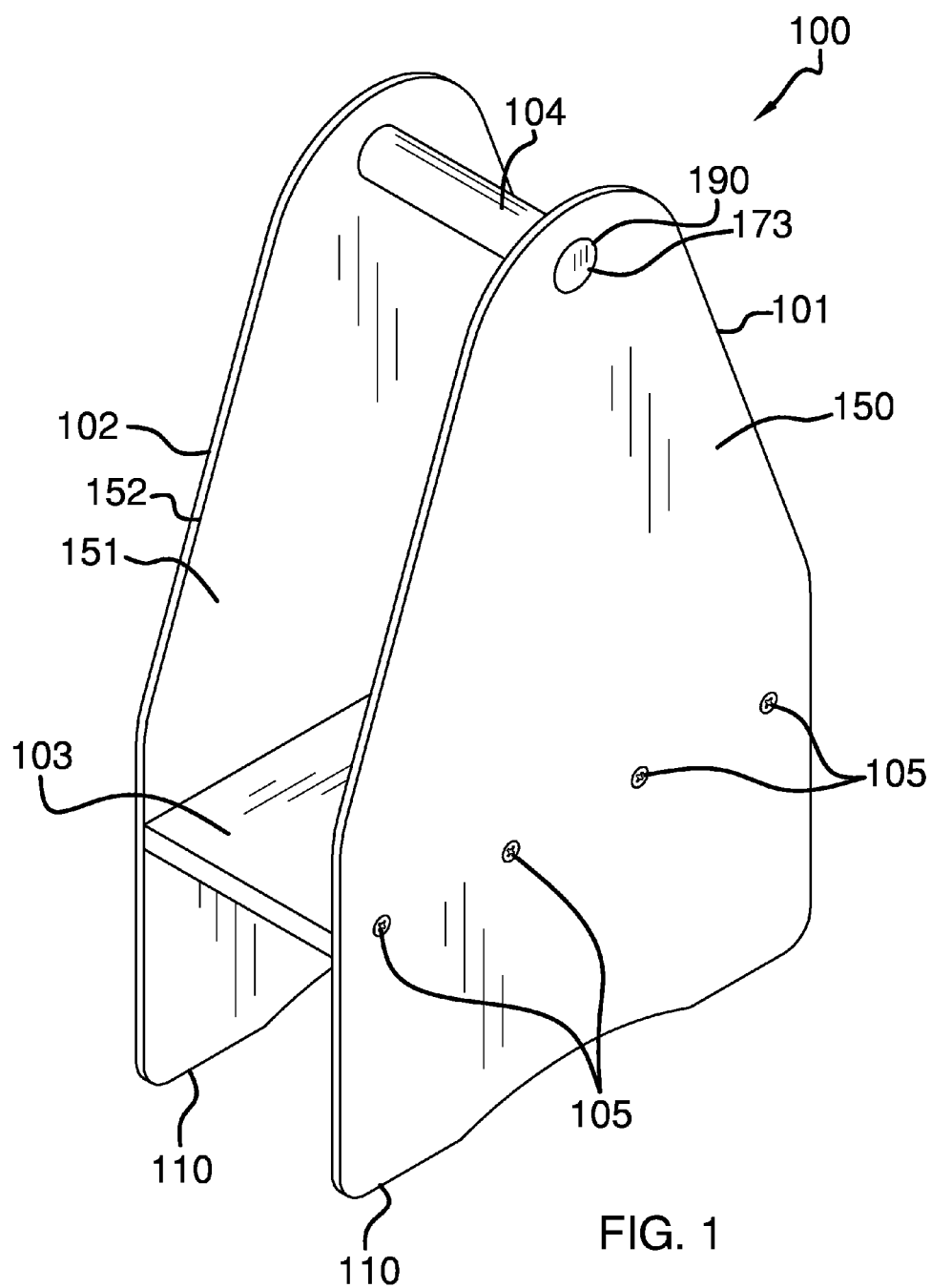
FIG. 1 is a perspective view of an embodiment of the disclosure.
Figure 2:
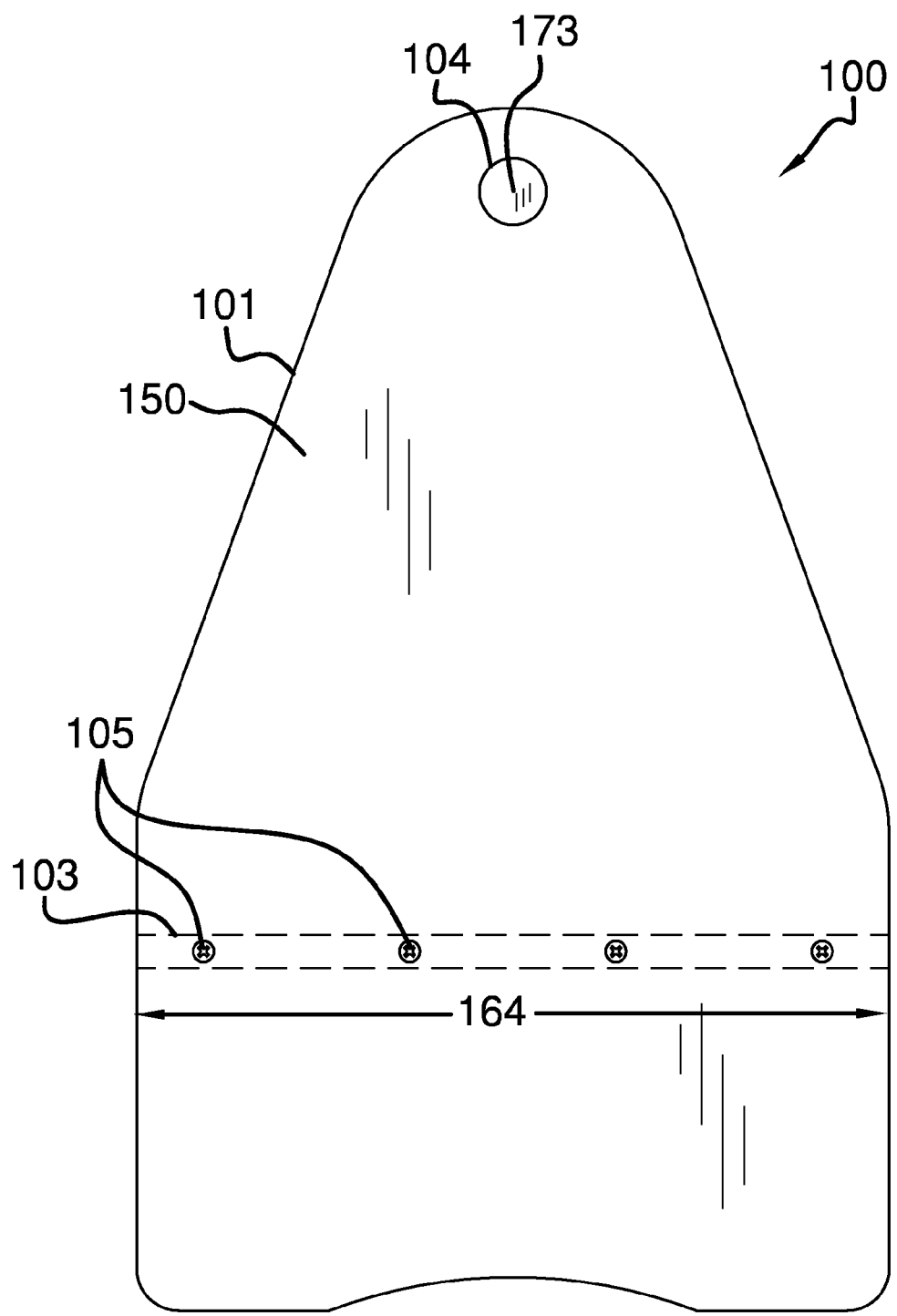
FIG. 2 is a front view of an embodiment of the disclosure.
Figure 3:
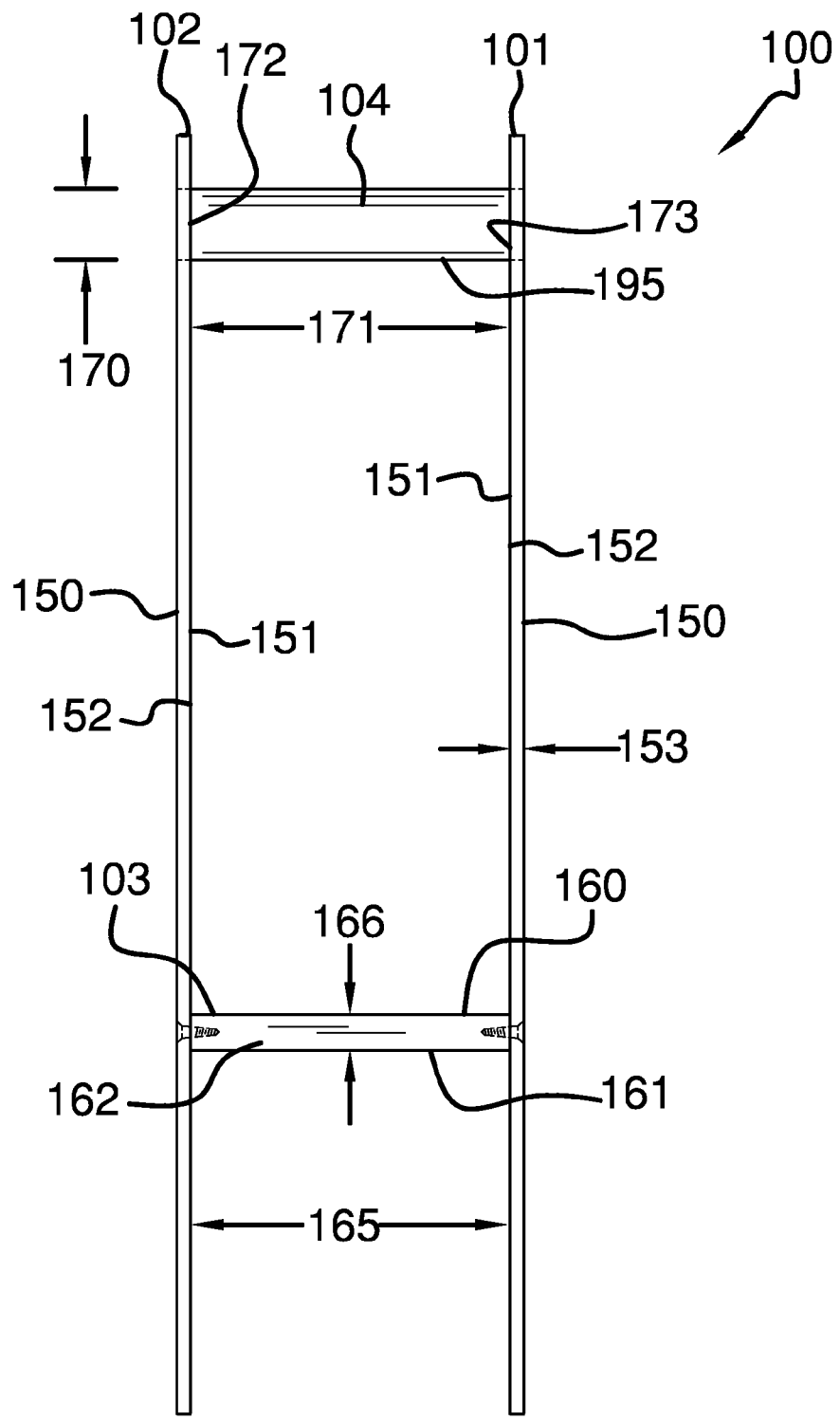
FIG. 3 is a side view of an embodiment of the disclosure.

As best illustrated in FIGS. 1 through 3, the bag-in-box wine container 100 (hereinafter invention) generally comprises a first panel 101 and a second panel 102, a shelf 103, a carrying dowel 104, and a plurality of screws 105.

The first panel 101 and the second panel 102 are made of plywood with each piece having an outer face 150, an inner face 151 and side faces 152. The first panel 101 and the second panel 102 are polygonal-shaped planar members. The outer face 150 and the inner face 151 are opposite to one another and have the same surface area and shape. The side faces 152 comprise all the surfaces other than the inner face 151 and the outer face 150. The outer face 150 and inner face 151 are selected so that they have a greater surface area than the side faces 152. The distance between the inner face 151 and the outer face 150 is called a depth 153.

The shelf 103 is made of plywood having an upper shelf face 160, a lower shelf face 161, and side shelf faces 162. The upper shelf face 160 and the lower shelf face 161 are opposite to one another and have the same surface area and shape. The side shelf faces 162 comprise all the surfaces other than the upper shelf face 160 and the lower shelf face 161. The upper shelf face 160 and the lower shelf face 161 are selected so that they have a greater surface area than the side shelf face 162. The upper shelf face 160 and the lower shelf face 161 of the shelf 103 have a shelf length 164 and a shelf width 165. The shelf length 164 is greater than the shelf width 165. The shelf length 164 of the shelf 103 is consistent with the first panel 101 and the second panel 102. Meaning that, the shelf length 164 defines an overall length of the invention 100. The shelf width 165 is consistent with a width of the first panel 101, the second panel 102, and the carrying dowel 104.

The carrying dowel 104 is a simple wooden dowel with a dowel diameter 170, a dowel length 171 and a first dowel end 172 and a second dowel end 173. The dowel length 171 is consistent with the shelf width 165. The first dowel end 172 touches the second panel 102, whereas the second dowel end 173 touches the first panel 101.

The assembly procedure is described in the next three paragraphs. A first hole 190 is drilled in the first panel 101 and the second panel 102. The first hole 190 is sized to accommodate receiving the carrying dowel 104. The first panel 101 is attached to the shelf 103 via a plurality of screws 105 that are screwed in from the outer face 150 of the first panel 101 into one of the side surfaces 162 of the shelf 103. The shelf 103 is positioned so that the direction of the length of the shelf 103 is perpendicular to the direction of the screws 105. The second panel 102 is placed on the opposite side of the shelf 103 so that the inner face 151 of the second panel 102 faces the inner face 151 of the first panel 101. The second panel 102 is attached to the shelf 103 with screws 105.

The first end of the carrying dowel 104 is fitted into the said first hole drilled in the first panel 101 and the second end of the carrying dowel 104 is fitted in the said second hole drilled into the second panel 102. The ends of the carrying dowel 104 are secured using commercially available wood glue.

Figure 4:
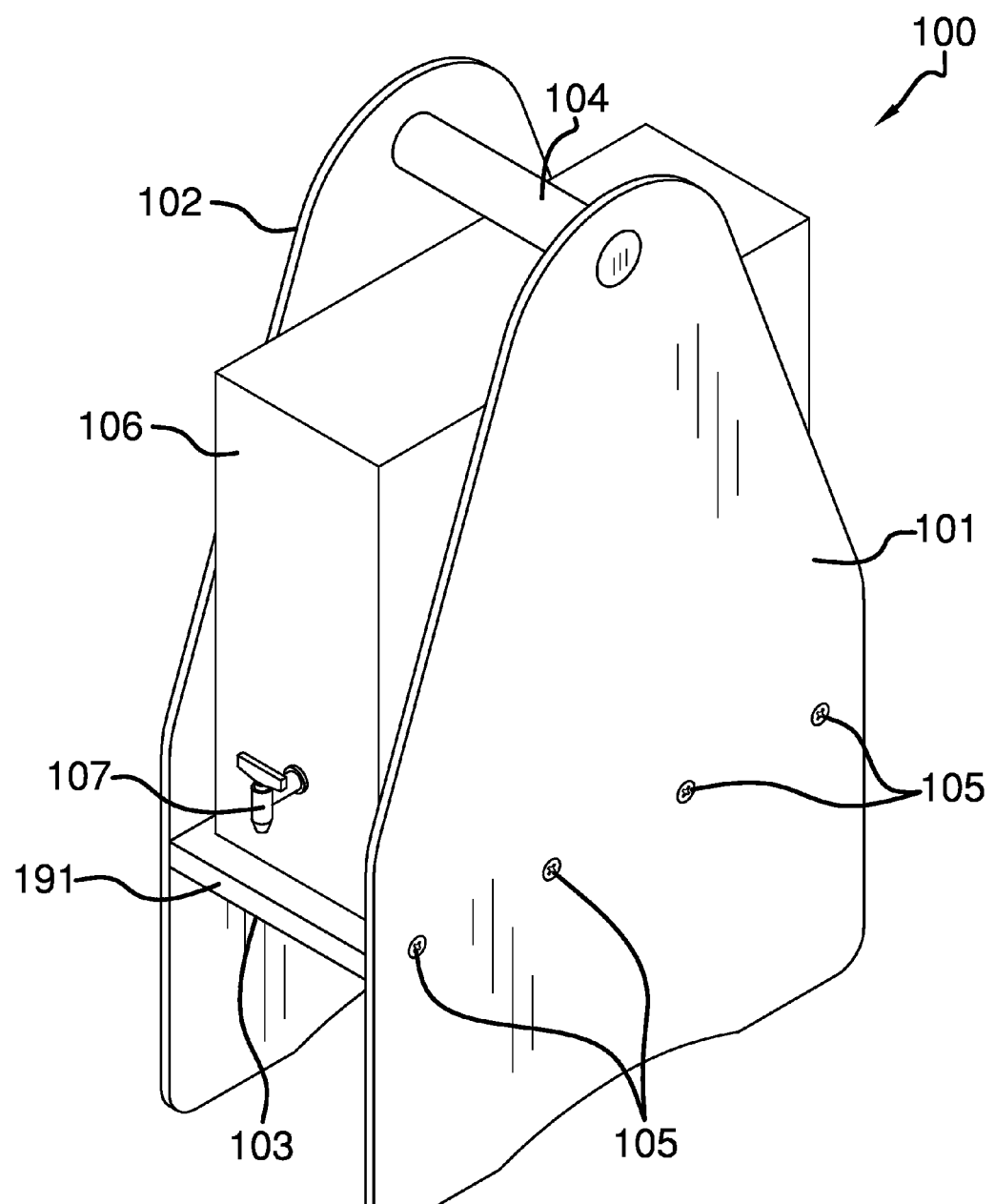
FIG. 4 is a perspective view of an embodiment of the disclosure in use.

FIG. 4 shows the invention 100 in use. A box of wine 106 is placed on the shelf 103. The box of wine 106 is prevented from shifting laterally by the first panel 101 and the second panel 102. The carrying dowel 104 acts as a handle to facilitate moving the invention 100 and the box of wine 106. The box of wine 106 is placed so that a spigot 107 extends over a front edge 191 of the shelf 103. This facilitates pouring the contents of the box of wine 106.

The following paragraphs describe the dimensions of the preferred embodiment of the wine stand. These dimensions are merely exemplary in nature and are not intended to limit the described embodiments of the application and uses of the described embodiments.

The outer face 150 of the first panel 101 may have a vertical span of 18.5 inches at its broadest point. The outer face 150 of the second panel 102 may have a vertical span of 18.5 inches at its broadest point. The outer face 150 of the first panel 101 may have a horizontal span of 11.25 inches at its broadest point. The outer face 150 of the second panel 102 may have a horizontal span of 11.25 inches at its broadest point. The depth 153 of first panel 101 and the second panel 102 may be 0.1875 inch.

The shelf length 164 of the shelf 103 may be 11.25 inches. The shelf width 165 of the shelf 103 may be 4.5 inches. A shelf depth 166 of the shelf may be 0.47 inch. The carrying dowel 104 may be 1" diameter and may have a length of 4.875 inches. The carrying dowel 104 and shelf 103 may be placed so that the span is 11.25 inches between an upper face 160 of the shelf 103 and a bottommost edge 195 of the carrying dowel 104. The shelf 103 may be placed so that the span is 5 inches between a base surface 110 of the invention 100 and a bottom face 161 of the shelf 103.

Figure 5:
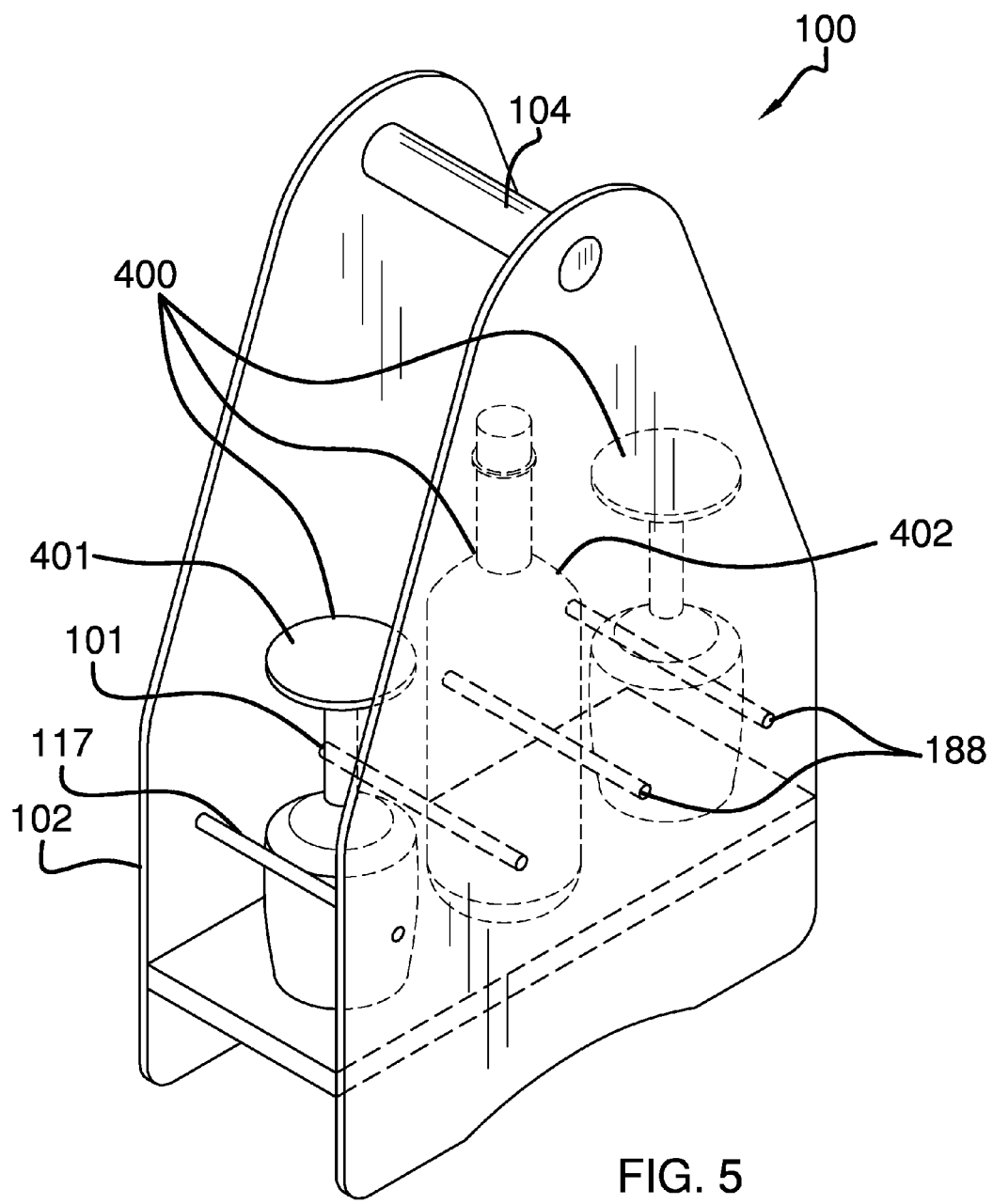
FIG. 5 is a perspective view of an alternative embodiment of the disclosure.

FIG. 5 presents an alternative embodiment of the wine stand where three support dowels 117 are used to replace the shelf 103. The support dowels 117 are mounted in dowel holes 188 drilled in the first panel 101 and the second panel 102 and are secured using a commercially available wood glue. The support dowels 117 are used to support items 400 therein. Moreover, the items 400 may comprise a wine glass 401 and/or a wine bottle 402.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A bag-in-box wine container comprising:
a first panel, a second panel, a carrying dowel, and a shelf;
said shelf supports a box of wine thereon;
said carrying dowel is provided to aid in carrying of said bag-in-box wine container;
wherein the first panel and the second panel are made of plywood with each having an outer face, an inner face and side faces; wherein the first panel and the second panel are polygonal-shaped planar members;
wherein the outer face and the inner face are opposite to one another and have the same surface area and shape; wherein the side faces comprise all the surfaces other than the inner face and the outer face; wherein the outer face and inner face are selected so that they have a greater surface area than the side faces;
wherein the box of wine is placed on the shelf; wherein the box of wine is prevented from shifting laterally by the first panel and the second panel; wherein the box of wine is placed so that a spigot extends over a front edge of the shelf thereby facilitating pouring of contents of the box of wine.

2. The bag-in-box wine container according to claim 1 wherein a depth is defined as the distance between the inner face and the outer face.

3. The bag-in-box wine container according to claim 2 wherein the shelf is made of plywood having an upper shelf face, a lower shelf face, and side shelf faces; wherein the upper shelf face and the lower shelf face are opposite to one another and have the same surface area and shape.

4. The bag-in-box wine container according to claim 3 wherein the side shelf faces comprise all the surfaces other than the upper shelf face and the lower shelf face; wherein the upper shelf face and the lower shelf face have a greater surface area than the side shelf face.

5. The bag-in-box wine container according to claim 4 wherein the upper shelf face and the lower shelf face of the shelf have a shelf length and a shelf width.

6. The bag-in-box wine container according to claim 5 wherein the shelf length is greater than the shelf width; wherein the shelf length of the shelf is consistent with the first panel and the second panel; wherein the shelf width is consistent with the first panel, the second panel, and the carrying dowel.

7. The bag-in-box wine container according to claim 6 wherein the carrying dowel is a wooden dowel with a dowel diameter, a dowel length, a first dowel end, and a second dowel end.

8. The bag-in-box wine container according to claim 7 wherein the dowel length is consistent with the shelf width; wherein the first dowel end touches the second panel, whereas the second dowel end touches the first panel.

9. The bag-in-box wine container according to claim 8 wherein the first panel and the second panel each have a first hole to accommodate receiving the carrying dowel; wherein the first panel and the second panel are each attached to the shelf via a plurality of screws that are screwed in from the outer face and into the shelf.

10. The bag-in-box wine container according to claim 1 wherein the shelf is positioned above a base surface.

11. A bag-in-box wine container comprising:
a first panel, a second panel, a carrying dowel, and a shelf;
said shelf is configured to support a box of wine thereon;
said carrying dowel is provided to aid in carrying of said bag-in-box wine container;
wherein the first panel and the second panel are made of plywood with each having an outer face, an inner face and side faces; wherein the first panel and the second panel are polygonal-shaped planar members;

wherein the outer face and the inner face are opposite to one another and have the same surface area and shape; wherein the side faces comprise all the surfaces other than the inner face and the outer face; wherein the outer face and inner face are selected so that they have a greater surface area than the side faces;

wherein a depth is defined as the distance between the inner face and the outer face; wherein the shelf is made of plywood having an upper shelf face, a lower shelf face, and side shelf faces; wherein the upper shelf face and the lower shelf face are opposite to one another and have the same surface area and shape;

wherein the side shelf faces comprise all the surfaces other than the upper shelf face and the lower shelf face; wherein the upper shelf face and the lower shelf face have a greater surface area than the side shelf face; wherein the upper shelf face and the lower shelf face of the shelf have a shelf length and a shelf width; wherein the shelf length is greater than the shelf width; wherein the shelf length of the shelf is consistent with the first panel and the second panel; wherein the shelf width is consistent with the first panel, the second panel, and the carrying dowel; wherein the carrying dowel is a wooden dowel with a dowel diameter, a dowel length, a first dowel end, and a second dowel end;

wherein the box of wine is placed on the shelf; wherein the box of wine is prevented from shifting laterally by the first panel and the second panel; wherein the box of wine is placed so that a spigot extends over a front edge of the shelf thereby facilitating pouring of contents of the box of wine; wherein the shelf is positioned above a base surface.

12. The bag-in-box wine container according to claim 11 wherein the dowel length is consistent with the shelf width; wherein the first dowel end touches the second panel, whereas the second dowel end touches the first panel; wherein the first panel and the second panel each have a first hole to accommodate receiving the carrying dowel; wherein the first panel and the second panel are each attached to the shelf via a plurality of screws that are screwed in from the outer face and into the shelf.

* * * * *